3,846,256
CHEMICAL TRAP
William C. Dietrich, Knoxville, Tenn., assignor to the United States of America as represented by the United States Atomic Energy Commission
Filed Sept. 17, 1973, Ser. No. 398,265
Int. Cl. B01d 3/00, 3/34; C01b 9/08
U.S. Cl. 203—33       8 Claims

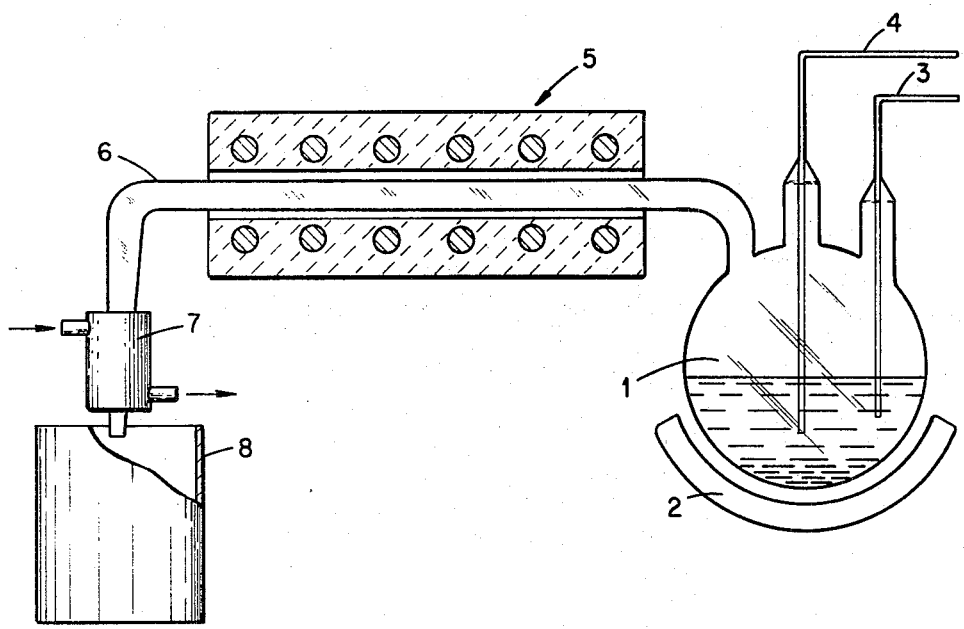

ABSTRACT OF THE DISCLOSURE

A method for removing fluoride contaminants from nitric acid by adding aluminum ions to the acid to form a non-distillable fluoride complex and distilling purified nitric acid from the solution.

BACKGROUND OF THE INVENTION

This invention was made in the course of, or under, a contract with the United States Atomic Energy Commission. It relates generally to the art of purifying nitric acid.

Vast quantities of nitric acid are used in industrial processes each year. In the field of nuclear fuel reprocessing and uranium refining, uranium is extracted from a nitric acid solution into an organic phase by a solvent extraction process. The nitric acid remaining from such a process is thus subject to disposal by either neutralization and dumping or, in the case of radioactive contamination, storage.

Nitric acid which has been used in such processes is normally contaminated with fluoride ions, chloride ions and, in the case of uranium processing, uranium ions. Most of these contaminants can be removed by distillation. The presence of fluoride ions, however, in nitric acid solution produces an extremely corrosive solution making the use of conventional distillation equipment impossible.

From the standpoint of protecting the environment from the adverse effects of excess nitrates, it would be highly desirable to provide a process for purifying and thus recycling contaminated nitric acid.

SUMMARY OF THE INVENTION

It is thus an object of this invention to provide a process for purifying and recycling contaminated nitric acid.

It is a particular object of this invention to provide a process for removing fluoride contaminants from nitric acid.

These as well as other objects are accomplished by distilling contaminated nitric acid in a glass reactor in the presence of aluminum nitrate and calcium nitrate.

BRIEF DESCRIPTION OF THE DRAWING

The single figure of drawing schematically illustrates an apparatus used in carrying out the process of this invention.

DETAILED DESCRIPTION

According to this invention, it has been found that aluminum nitrate will complex fluorine which is present in nitric acid so as to form a non-distillable fluoride. It has been further found that the addition of calcium nitrate will prevent excess aluminum nitrate from hydrolyzing and precipitating, thus permitting the process to be carried out on a continuous basis. Equivalents of calcium may be considered to be $Zn(NO_3)_3 \cdot 3H_2O$ and $$La(NO_3)_2 6H_2O.$$

Feed solutions in this process may be contaminated with four to five thousand p.p.m. fluoride.

The process of this invention is best understood by referring to FIG. 1 of the drawing. The apparatus for carrying out the process of this invention generally comprises a glass retort 1 containing nitric acid, aluminum nitrate and calcium nitrate, heating means 2, a source of contaminated acid 3, an oxygen source 4, a clam shell furnace 5 for heating retort extension 6, a condenser 7, and collection means 8.

By maintaining the solution within retort 1 at boiling, essentially pure nitric acid is collected in container 8. Fluoride impurities are retained within retort 1 as a non-distillable aluminum fluoride complex. Uranium as well as other cationic impurities is retained in non-distillable form within retort 1. Higher boiling acids such as sulfuric and phosphoric acids also remain in retort 1.

The concentration of the nitric acid in retort 1 is not critical. However, it is preferred to maintain a molarity of about 1 to 2 in order to reduce the hydrolysis of aluminum and to assure a low fluoride in the distillate. At least six moles of aluminum must be present in retort 1 for every mole of fluorine which is to be removed. Preferably 6 to 8 moles of aluminum are present for every mole of fluoride which is to be removed. This is in order to sustain the reaction,

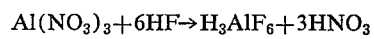

$$Al(NO_3)_3 + 6HF \rightarrow H_3AlF_6 + 3HNO_3$$

Also about four to six moles of calcium are present for each mole of aluminum to prevent the aluminum nitrate from hydrolyzing and forming insoluble hydrated alumina.

The concentration of the nitric acid distillate can generally be preselected by controlling the concentration of the nitric acid in the retort. It is preferred to produce a distillate of about 1 to 2 molar nitric acid. In order to produce a distillate of this molarity, a nitric acid concentration of 0.5 to 1.0 molar must be maintained within the retort. In instances where the contaminated nitric acid is of a molarity which is greater than that of the desired distillate, it is preferred to dilute the contaminated acid to the concentration of the desired distillate. In this manner an equilibrium is established so that the contents of the retort will not have to be monitored.

Retort extension 6 is preferably heated to a temperature of about 250° C. by clam shell furnace 5 to prevent refluxing. Air or oxygen is fed through source 4 at a rate of about 300 ml./min. in order to sweep the vapors toward condenser 7. The oxygen also minimizes the decomposition of nitric acid vapor.

The process of this invention may also be carried out by using the contaminated feed solution to fill the retort. In such a case the aluminum nitrate and calcium nitrate may be added directly to the feed stream on either a periodic or continuous basis or simply added to the retort as before. In a continuous operation the contents of the retort can be periodically replaced so as to maintain an aluminum nitrate concentration of about 1 molar and a calcium nitrate concentration of about 6 molar.

Having generally described the invention, the following specific examples are given as a further illustration.

Example I

A retort solution containing 546 gm. of calcium nitrate, 246 gm. of aluminum nitrate and 10 ml. of concentrated nitric acid was heated to boiling temperature. Vapors from the boiling trap solution were swept through a heated glass tube 6 into glass condenser 7 with a stream of air having a flow rate of 370 cc. per minute.

Feed solutions of 1 molar, 3 molar, and 6 molar nitric acid were spiked with 400 p.p.m. fluoride in the form of hydrofluosilicic acid. Each feed solution was passed through the retort solution at a rate of 170 ml. per hour. The purified nitric acid was collected in 55 ml. aliquots.

Analysis of aliquots indicated that the average fluoride content in the purified distillate was 3 p.p.m. for the 1 molar nitric acid feed, 9 p.p.m. for the 3 molar acid feed, and 20 p.p.m. for the 6 molar acid feed. The complete results of the analysis are given in Table I.

TABLE I

| Sample | $HNO_3$, M Feed | $HNO_3$, M Dist. | Conc. F (p.p.m.) in dist. | Sample | $HNO_3$, M Feed | $HNO_3$, M Dist. | Conc. F (p.p.m.) in dist. | Sample | $HNO_3$, M Feed | $HNO_3$, M Dist. | Conc. F (p.p.m.) in dist. |
|---|---|---|---|---|---|---|---|---|---|---|---|
| 1 | 1.03 | 1.94 | 4.9 | 21 | 3.01 | 1.25 |  | 41 | 6.10 | 1.48 |  |
| 2 | 1.03 | 1.70 |  | 22 | 3.01 | 1.70 |  | 42 | 6.10 | 2.90 |  |
|  |  |  |  |  |  |  |  | 43 | 6.10 | 4.25 | 16.2 |
| 3 | 1.03 | 1.43 |  | 23 | 3.01 | 2.24 |  | 44 | 6.10 | 4.00 |  |
| 4 | 1.03 | 1.20 |  | 24 | 3.01 | 2.32 |  | 45 | 6.10 | 5.45 |  |
| 5 | 1.03 | 1.07 | 1.4 | 25 | 3.01 | 2.59 | 8.9 | 46 | 6.10 | 5.62 |  |
| 6 | 1.03 | 1.04 |  |  |  |  |  | 47 | 6.10 | 5.85 | 19.8 |
| 7 | 1.03 | 1.00 |  | 26 | 1.03 | 2.72 |  |  |  |  |  |
| 8 | 1.03 | 1.04 |  | 27 | 1.03 | 2.24 | 3.7 | 48 | 1.03 | 5.80 |  |
|  |  |  |  |  |  |  |  | 49 | 1.03 | 4.41 |  |
| 9 | 1.03 | 1.08 |  | 28 | 1.03 | 1.82 |  | 50 | 1.03 | 3.02 | 5.9 |
| 10 | 1.03 | 1.05 | 2.2 | 29 | 1.03 | 1.60 |  | 51 | 1.03 | 2.28 |  |
|  |  |  |  | 30 | 1.03 | 1.44 | 6.2 | 52 | 1.03 | 1.82 |  |
| 11 | 3.01 | 1.13 |  | 31 | 3.01 | 1.40 |  | 53 | 3.01 | 2.02 |  |
| 12 | 3.01 | 1.78 |  | 32 | 3.01 | 1.85 |  | 54 | 3.01 | 2.20 |  |
| 13 | 3.01 | 2.34 | 2.4 | 33 | 3.01 | 2.27 | 3.4 | 55 | 3.01 | 2.45 |  |
| 14 | 3.01 | 2.57 |  | 34 | 3.01 | 2.53 |  | 56 | 3.01 | 2.78 |  |
| 15 | 3.01 | 2.72 |  | 35 | 3.01 | 2.67 | 11.7 | 57 | 3.01 | 3.00 | 8.0 |
| 16 | 1.03 | 2.69 |  | 36 | 1.03 | 2.70 |  | 58 | 1.03 | 2.87 |  |
| 17 | 1.03 | 2.10 |  | 37 | 1.03 | 2.20 |  | 59 | 1.03 | 2.04 |  |
| 18 | 1.03 | 1.61 |  | 38 | 1.03 | 1.75 | 3.6 | 60 | 1.03 | 1.34 |  |
| 19 | 1.03 | 1.39 |  | 39 | 1.03 | 1.56 |  | 61 | 1.03 | 1.30 |  |
| 20 | 1.03 | 1.23 | 2.6 | 40 | 1.03 | 1.40 | 3.6 | 62 | 1.03 | 1.18 |  |

Example II

In another operation, 13 grams of aluminum nitrate per liter was added to each of the feed solutions described in Example I. A solution of 546 grams of hydrated calcium nitrate, 246 grams of hydrated aluminum nitrate, and 14 ml. of concentrated nitric acid was in the retort. Each of the feed solutions was passed through the retort as described in Example I. The purified feed solutions were collected in 55 ml. aliquots. Analysis of each aliquot indicated an average fluoride content of 0.5 p.p.m., and 1.6 p.p.m. respectively, for 1, 3 and 6 molar nitric acid feed solutions. Complete results are given in Table II.

TABLE II

| Sample | $HNO_3$, M Feed | Distillate | F (p.p.m.) |
|---|---|---|---|
| 1 | 1.03 | 2.17 | 0.35 |
| 4 | 1.03 | 1.40 | 0.60 |
| 6 | 1.03 | 1.12 | 0.80 |
| 9 | 3.01 | 2.37 | 0.30 |
| 12 | 3.01 | 2.94 | 0.35 |
| 15 | 1.03 | 1.63 | 0.65 |
| 18 | 1.03 | 1.09 | 0.55 |
| 21 | 6.10 | 4.30 | 2.00 |
| 23 | 6.10 | 5.50 | 2.15 |
| 26 | 6.10 | 6.03 | 0.65 |
| 29 | 1.03 | 3.56 | 0.35 |
| 31 | 1.03 | 1.53 | 0.30 |
| 34 | 1.03 | 1.32 | 0.30 |
| 37 | 3.01 | 2.39 | 0.30 |
| 40 | 3.01 | 2.99 | 0.25 |
| 43 | 1.03 | 1.75 | 0.75 |
| 46 | 1.03 | 1.30 | 0.55 |

As is readily apparent from the above description and examples, the process of this invention provides a highly efficient method for purifying nitric acid. The thus purified nitric acid may be used as is or further purified by conventional distillation techniques. Since the purified nitric acid contains essentially no fluoride impurities, conventional distillation equipment can be used without fear of undue corrosion.

What is claimed is:

1. A method for purifying contaminated nitric acid containing fluoride impurities comprising the steps of:
    preparing a solution containing said contaminated acid, aluminum ions and calcium ions;
    boiling said solution to give off nitric acid vapor and to react said aluminum with said fluoride impurities to form a non-distillable aluminum fluoride complex; and
    condensing said vapor as purified nitric acid.

2. The method according to claim 1 wherein said solution contains at least 6 moles of aluminum for every mole of fluoride which is to be removed.

3. The method according to claim 2 wherein said solution contains 4 to 6 moles of calcium for every mole of aluminum.

4. The method according to claim 1 wherein said contaminated acid is fed continuously into said solution.

5. The method according to claim 4 wherein said aluminum and calcium ions are added to said continuous feed of contaminated acid.

6. The method according to claim 1 wherein said solution is 1 to 3 molar in nitric acid.

7. The method according to claim 1 wherein said purified nitric acid is 1 to 3 molar and contains less than 10 p.p.m. fluoride.

8. The method according to claim 1 wherein fluoride impurities are present in a concentration of 5000 parts per million or less.

References Cited

UNITED STATES PATENTS

| 864,217 | 8/1907 | Wolffenstein et al. | 203—33 |
| 2,426,558 | 8/1947 | Long et al. | 423—472 X |
| 2,592,113 | 4/1952 | Brodal et al. | 423—465 |
| 3,514,253 | 5/1970 | Robota et al. | 423—465 |
| 3,755,548 | 8/1973 | Weise et al. | 423—465 X |
| 3,773,905 | 11/1973 | Arendt | 423—472 X |

FOREIGN PATENTS 328,156  4/1930  Great Britain _____ 423—390

JOHN H. MACK, Primary Examiner

A. C. PRESCOTT, Assistant Examiner

U.S. Cl. X.R.

203—29; 423—390, 465, 472